Nov. 9, 1965  E. J. BARTHOLET  3,216,695
FLUID PRESSURE RESPONSIVE RUBBER SEATED BUTTERFLY VALVE
Filed Dec. 11, 1961
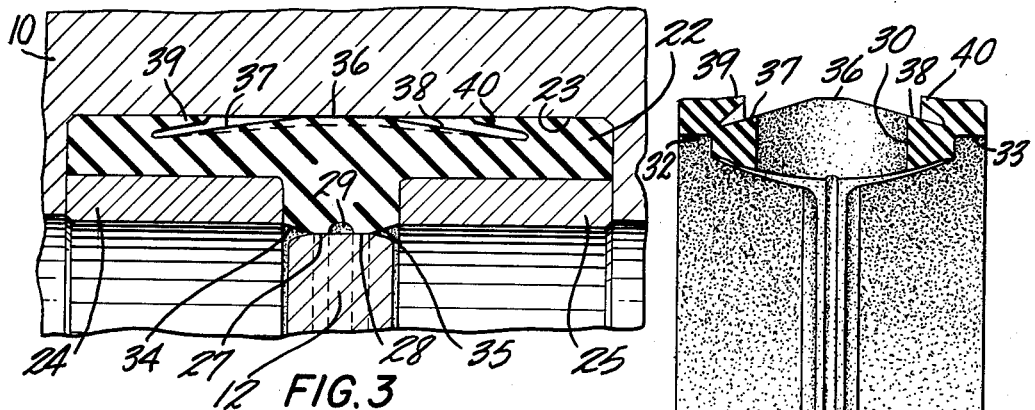
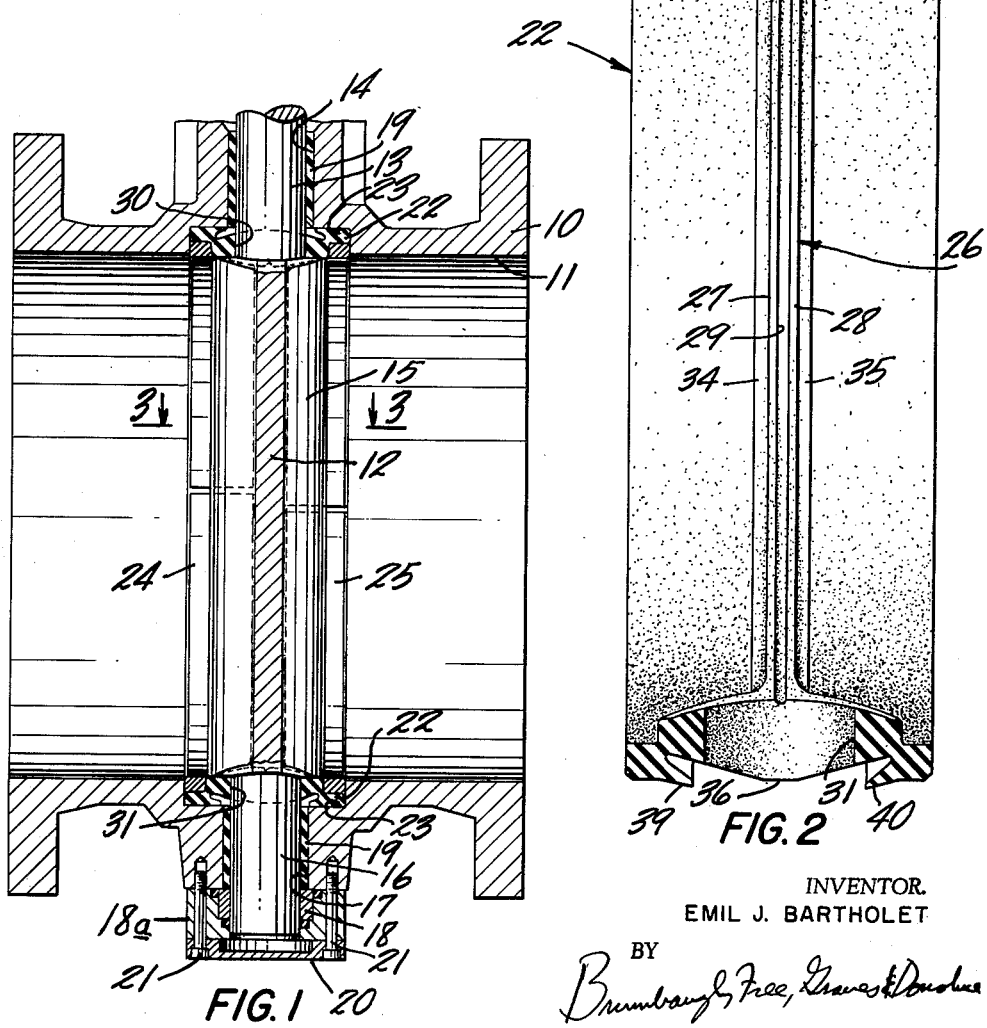
INVENTOR.
EMIL J. BARTHOLET
BY
his  ATTORNEYS

United States Patent Office 3,216,695
Patented Nov. 9, 1965

3,216,695
FLUID PRESSURE RESPONSIVE RUBBER SEATED BUTTERFLY VALVE
Emil J. Bartholet, Union, N.J., assignor to A. P. Smith Manufacturing Company, Orange, N.J., a corporation of New Jersey
Filed Dec. 11, 1961, Ser. No. 158,363
7 Claims. (Cl. 251—173)

This invention relates to butterfly valves having a resilient vane seat and, more particularly, to a new and improved butterfly valve utilizing a resilient vane seat to provide a tight seal in a highly effective manner.

Generally, butterfly valves wherein a control vane is seated against a resilient material such as rubber in order to form a tight seal when the valve is fully closed have been subject to several disadvantages. Among these is the excessive abrasion of the resilient sealing material which must, during each closing operation, be forced against the vane with sufficiently high pressure to resist the maximum rated operating pressure of the valve, regardless of the actual fluid pressure to be sealed in a particular instance. Another disadvantage of conventional rubber seated butterfly valves is that, in the closed position of the vane, the rubber seat is compressed between the vane and a rigid body portion, eventually causing a compression set whereby the rubber loses its resilience and does not fully recover after the vane is opened so that the valve leaks when the set has progressed beyond a certain point.

Accordingly, it is an object of the present invention to provide a new and improved butterfly valve which overcomes the above-mentioned disadvantages of conventional butterfly valves.

Another object of the invention is to provide a new and improved butterfly valve having a resilient seat which exerts a minimum contact pressure between the vane and the seat during the closing of the valve.

A further object of the invention is to provide a new and improved butterfly valve having a resilient seat wherein the sealing pressure between the vane and the seat is varied according to the pressure of the fluid controlled by the valve.

An additional object of the invention is to provide a butterfly valve of the above character which is equally effective in either direction of fluid flow through the valve.

These and other objects of the invention are attained by providing in a butterfly valve a resilient sealing member normally engaging the peripherial surface of the valve vane in its closed position with a minimum initial contact pressure, but having a cavity between the sealing member and the valve body which is exposed to fluid on the upstream side of the valve so as to transmit the fluid pressure through the resilient material increasing the sealing pressure above the initial contact pressure in accordance with the pressure of the fluid controlled by the valve. In a particular embodiment of the invention the resilient sealing member has surface portions adjacent to the vane-engaging surface which are exposed to the valve passageway and includes means for conducting fluid into the cavity from the upstream side of the vane but preventing fluid from flowing out of the cavity to the downstream side of the vane.

Further objects and advantages of the invention will be apparent from a reading of the following description in conjunction with the accompanying drawings, in which:

FIG. 1 is a view in longitudinal section through a typical butterfly valve arranged according to the invention;

FIG. 2 is an enlarged cross-sectional view of the resilient sealing member utilized in the valve shown in FIG. 1; and FIG. 3 is a partial sectional view, further enlarged, taken on the line 3—3 of FIG. 1 and looking in the direction of the arrows.

In the representative embodiment of the invention shown in the drawings, the butterfly valve comprises a tubular valve body 10 having a passage 11 for fluid flow therethrough and a disk-shaped vane member 12 supported for pivotal motion on an axis transverse to the direction of fluid flow. In order to rotate the vane 12 about this axis a drive shaft 13 passes through a radial opening 14 in the valve body 10 and is affixed to an enlarged central portion 15 of the vane which extends along the axis of rotation, while a similar shaft 16 projects from the other end of the enlarged vane portion through another valve body opening 17 diametrically opposite to the opening 14. A ring 18 pressed onto the shaft 16 and held between the valve body 10 and a removable part 18a, supports the vane in the axial direction and a self-lubricating bearing sleeve 19 is mounted between each of the shafts 13 and 16 and the corresponding opening in the valve body. Furthermore, to permit access to the shaft 16, a cap 20 is removably attached to the valve body 10 by bolts 21, the part 18a, which also contains O-type sealing rings, being separately attached by similar bolts (not illustrated) so that the cover 20 can be removed without affecting the shaft seal and vane support for the purpose of readjusting or centering the vane assembly with the valve in service.

In accordance with the present invention, an annular resilient sealing member 22 made of rubber or the like, which is illustrated in the magnified view of FIG. 2, is mounted in an annular recess 23 in the valve body 10 so as to surround the vane 12 when it is in the closed position shown in the drawings, the sealing member being held firmly in the recess 23 by two split rings 24 and 25. As best seen in FIG. 2, the sealing member 22 has an inwardly projecting surface 26 positioned to engage the periphery of the vane and this surface is divided into two portions 27 and 28 by an annular central groove 29 which communicates with two diametrically opposite apertures 30 and 31 for the vane support shafts 13 and 16. Slanting laterally and outwardly away from the surface portions 27 and 28 toward two recesses 32 and 33 for receiving the two split rings respectively are two beveled surface portions 34 and 35, and as illustrated in FIG. 3, each of these surface portions is exposed to fluid in the valve passage on one side of the vane 12. It will be understood that, in the areas surrounding the openings 30 and 31, the inwardly projecting portion of the member 22 is laterally enlarged so that the recesses 32 and 33 and the corresponding portions of the retaining rings 24 and 25 are correspondingly narrower in these areas, as shown in FIGS. 1 and 2, but that the remainder of the retaining rings and recesses have the widths illustrated in FIG. 3. Instead of the resilient type of split rings illustrated in the drawings, the retaining rings 24 and 25 may each be made of a plurality of segments which are pressed inwardly against the sealing member 22 during installation. This arrangement facilitates removal of the retaining rings.

Radially outwardly from the vane engaging surface 26 the member 22 is formed with a peripherial valve body engaging surface 36 and the thickness of the sealing member 22 between the surfaces 36 and 26 is selected in accordance with the diameter of the vane 12, the inside diameter of the recess 23 and the resilience of the material used to form the sealing member to produce the minimum initial radial contact pressure between the sealing member and the vane necessary to assure complete closing of the passage 11 when the vane 10 is turned to the closed position. On each side of the valve body-engaging surface 36, the periphery of the sealing member is provided with recesses 37 and 38 and is formed laterally outwardly thereof with lips 39 and 40 which extend toward the surface 36 and normally project radially outwardly from the peripheral surface of the sealing member, as shown in FIG. 2. When the sealing member 22 is inserted in the recess 23 these lips are forced inwardly by the surface of the valve body in the manner shown in FIG. 3 and the recesses 37 and 38 cooperate with the valve body to form corresponding cavities between the sealing member and the body.

In operation, when the vane 12 is moved to the closed position, as shown in FIGS. 1 and 3, the contact pressure between the periphery and the vane and the sealing member at the surfaces 27 and 28 is at the previously mentioned minimum value produced by the resilience of the seal as it is compressed slightly by the vane and the valve body. As a result, abrasion of the sealing member is minimized. As soon as the vane is completely closed, however, blocking all flow of fluid through the valve, the pressure on the upstream side of the vane increases to a value substantially above that in the peripheral cavities formed by the recesses 37 and 38, and this pressure, applied to the sealing member surface 34 or 35 which is exposed to the upstream fluid, displaces the sealing member slightly to permit the high pressure fluid to pass into the annular groove 29 between the vane-engaging surfaces 27 and 28.

From the groove 29 the fluid passes between the sealing member and the vane support shafts 13 and 16 at the openings 30 and 31 and into the cavities formed by the recesses 37 and 38, raising the pressure in the cavities to a value substantially equal to the upstream pressure. Alternatively, if the sealing member is not forced too tightly against the valve body by the split rings 24 and 25, the upstream fluid may leak from the upstream portion of the valve passage into the cavity by passing between the outside surfaces of the sealing member and the adjacent surfaces of the valve body. In either case the projecting lip 39 or 40 on the downstream side of the sealing member is forced tightly against the valve body by the increased pressure in the cavity so that leakage of fluid from the cavity to the downstream side of the valve passage is effectively prevented. It will be understood that, since the sealing member 22 is completely symmetrical with respect to the vane 12, it is equally effective for either direction of fluid flow through the valve.

Inasmuch as the sealing member 22 is made of resilient material, it tends to distribute pressure uniformly throughout its structure and, because the upstream pressure is applied to the sealing member at all points except at the beveled surface 34 or 35 which is on the downstream side of the vane 12, the sealing member is forced in the direction of that surface with a pressure equal with the upstream pressure and, at the same time, the adjacent portion 27 or 28 of the sealing surface is also forced against the periphery of the vane 12 with the same pressure, thereby increasing the sealing pressure in proportion to the pressure of the fluid being controlled by the valve. It will be readily apparent that, as long as the upstream pressure is maintained, the total force urging the vane-engaging surface of the sealing member toward the vane 12, which is equal to the upstream pressure multiplied by the area between the split rings 24 and 25, will be considerably greater than the force tending to disengage the sealing member from the vane, which is equal to the upstream pressure multiplied by the areas of the surfaces 27–29 and one of the surfaces 34 and 35 added to the downstream pressure multiplied by the area of the other surface 34 or 35. Furthermore, this is true even if the deflection of the sealing member 22 toward the downstream surface 34 or 35 by the differential in pressure is sufficient to displace the surface 36 away from the housing 10, as indicated by the dashed line in FIG. 3, since the same pressure relationship will still apply.

When the vane 12 is opened, fluid from the cavities formed by the recesses 37 and 38 flows out through the groove 29 as soon as the vane has moved far enough to expose the groove to the downstream side of the passageway. As a result, the contact pressure between the vane and the sealing member is at the minimum value for the remainder of the valve-opening motion. It will be understood that, because the contact pressure is normally at minimum value, even if the vane 12 is kept closed for long periods of time when the valve is not in use there will be no appreciable compression set problem.

It will be apparent from the foregoing that the present invention provides a butterfly valve utilizing a resilient sealing member wherein abrasion of the sealing member and compression set are minimized while, at the same time, providing a fluid-tight seal for high pressure as well as low pressure fluids. Moreover, the resilient member of the valve is completely recessed and substantially enclosed in the valve body so that the fluid passage therethrough is smooth and has the full nominal dimension of the valve passageway. Also, if necessary, the sealing member 22 can be replaced by a similar member which is split tranversely through the apertures 30 and 31 merely by removing the rings 24 and 25.

Although the invention has been described herein with reference to a specific embodiment, many modifications and variations therein will readily occur to those skilled in the art. Accordingly, all such variations and modifications are included within the intended scope of the invention as defined by the following claims.

I claim:

1. A butterfly valve comprising a valve body having a passageway for fluid therethrough, vane means supported in the valve passageway for motion between an open position and a closed position and having a peripheral surface, resilient sealing means mounted in the valve body having a vane-engaging surface portion to engage the peripheral surface of the vane means with a minimum initial contact pressure, and seal confining means forming, in conjunction with the valve body, a substantially complete enclosure for the resilient sealing means except for the vane-engaging surface portion, whereby increased pressure applied to a portion of the sealing means when the vane means is in the closed position is transmitted to the vane-engaging surface portion so as to increase the contact pressure with the periphery of the vane means, including means forming a cavity between the sealing means and an adjacent portion of the valve body, and means providing fluid communication between the valve passageway and the cavity in response to a fluid pressure in the valve passageway exceeding that in the cavity and wherein said means providing fluid communication between the valve passageway and the cavity includes a central annular groove formed in the vane-engaging surface portion of the sealing means and communicating with the cavity between the sealing means and the adjacent valve body portion.

2. A butterfly valve according to claim 1 including support means for the vane means extending through the sealing means and including openings in the sealing means for the vane support means whereby the central annular groove communicates with the cavity.

3. A butterfly valve according to claim 1 wherein the means providing fluid communication between the valve passageway and the cavity includes lip portions formed on the sealing means adjacent to the cavity normally projecting outwardly toward the location of the valve body and directed toward the cavity.

4. A butterfly valve comprising a valve body having a passageway for fluid flow therethrough, a control vane pivotally supported from the valve body within the valve passageway for motion between an open position and a closed position and having a peripheral surface, means forming a recess in the valve body surrounding the vane in its closed position, a resilient sealing member mounted in the valve body recess having an outer surface normally engaging the valve body within the recess and an inner surface engaging the peripheral surface of the vane and including means forming a cavity between the sealing member and the valve body, means providing fluid communication between the valve passageway and the cavity in response to a fluid pressure in the valve passageway exceeding that in the cavity including at least one projecting lip formed on the sealing member adjacent to the valve body, the vane-engaging surface of the sealing member being formed with a central groove communicating with the cavity, and seal confining means forming, in conjunction with the valve body, a substantially complete enclosure for the resilient sealing member except for the vane-engaging surface portion, whereby increased pressure applied to a portion of the sealing member when the vane means is in the closed position is transmitted to the vane-engaging surface portion so as to increase the contact pressure with the periphery of the vane means.

5. A butterfly valve according to claim 4 wherein the seal confining means comprises split ring retaining means for holding the sealing member into the recess in the valve body with sufficient force to prevent fluid flow from the cavity to a lower pressure area.

6. A butterfly valve comprising a valve body having a passageway for fluid flow therethrough, vane means supported in the valve passageway for motion between an open position and a closed position and having a peripheral surface, resilient sealing means mounted in the valve body having a vane-engaging surface portion to engage the peripheral surface of the vane means with a minimum initial contact pressure, and seal confining means forming, in conjunction with the valve body and the vane means in the closed position of the vane, a substantially complete enclosure for the resilient sealing means, the seal confining means providing an annulus permitting the sealing means vane-engaging surface portion to be exposed to the periphery of the vane means, the annulus having a width substantially equal to the thickness of the vane means at the peripheral surface thereof, whereby increased pressure applied to a portion of the sealing means is transmitted to the vane-engaging surface portion so as to increase the contact pressure with the periphery of the vane means but, at the same time, distortion of the resilient sealing means is effectively prevented.

7. A butterfly valve according to claim 6 wherein the vane-engaging surface portion of the sealing means is formed with an annular groove.

References Cited by the Examiner
UNITED STATES PATENTS

| | | | |
|---|---|---|---|
| 2,863,630 | 12/58 | Broz | 251—173 |
| 2,911,184 | 11/59 | Moore | 251—173 |
| 2,923,524 | 2/60 | Fawkes | 251—306 |
| 2,939,674 | 6/60 | Anderson | 251—173 |
| 3,105,672 | 10/63 | Kinney | 251—306 |

FOREIGN PATENTS 1,130,544  10/56  France.

ISADOR WEIL, *Primary Examiner.*

CLARENCE R. GORDON, *Examiner.*